US008285152B2

(12) United States Patent
Akiyama et al.

(10) Patent No.: US 8,285,152 B2

(45) Date of Patent: Oct. 9, 2012

(54) DQPSK OPTICAL RECEIVER

(75) Inventors: Yuichi Akiyama, Kawasaki (JP); Toshiki Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/372,687

(22) Filed: Feb. 14, 2012

(65) Prior Publication Data

US 2012/0141145 A1 Jun. 7, 2012

(30) Foreign Application Priority Data

Nov. 30, 2007 (JP) ................................ 2007-310148

(51) Int. Cl.
*H04B 10/06* (2006.01)

(52) U.S. Cl. ........ 398/202; 398/206; 398/208; 398/210; 398/214

(58) Field of Classification Search .................. 398/202, 398/206, 207, 208, 209, 210, 213, 214
See application file for complete search history.

(56) References Cited

U.S. PATENT DOCUMENTS

| | | | | |
|---|---|---|---|---|
| 7,444,085 B2 * | 10/2008 | Ikeuchi et al. | ................ | 398/202 |
| 7,609,982 B2 * | 10/2009 | Ikeuchi | ........................ | 398/214 |
| 7,676,162 B2 * | 3/2010 | Isomura et al. | ............... | 398/212 |
| 7,684,713 B2 * | 3/2010 | Terayama et al. | ............ | 398/208 |
| 7,877,025 B2 * | 1/2011 | Tao et al. | ...................... | 398/209 |
| 2004/0081470 A1 | 4/2004 | Griffin | | |
| 2007/0036556 A1 | 2/2007 | Liu et al. | | |
| 2007/0292140 A1 | 12/2007 | Terayama et al. | | |
| 2008/0056733 A1 | 3/2008 | Isomura et al. | | |

FOREIGN PATENT DOCUMENTS

| | | |
|---|---|---|
| EP | 1816763 | 8/2007 |
| EP | 1868305 | 12/2007 |
| WO | WO 02/51041 | 6/2002 |
| WO | WO 2007/007864 | 1/2007 |

OTHER PUBLICATIONS

Patent Abstracts of Japan, Publication No. 2007-020138, Published Jan. 25, 2007.
Patent Abstracts of Japan, Publication No. 2007-060443, Published Mar. 8, 2007.
Patent Abstracts of Japan, Publication No. 2006-270909, Published Oct. 5, 2006.
Patent Abstracts of Japan, Publication No. 2007-274235, Published Oct. 18, 2007.
Patent Abstracts of Japan, Publication No. 2007-158852, Published Jun. 21, 2007.

(Continued)

*Primary Examiner* — M. R. Sedighian
(74) *Attorney, Agent, or Firm* — Staas & Halsey LLP

(57) ABSTRACT

According to an aspect of an embodiment, a DQPSK optical receiver, comprising: a first LPF connected to a line branching off from between a first optical-electrical converter and a first data recovery circuit; a second LPF connected to a line branching off from between a second optical-electrical converter and a second data recovery circuit; a first LIA for amplifying a signal output from the first LPF and also limiting an amplitude of an output signal thereof; a second LIA for amplifying a signal output from the second LPF and also limiting an amplitude of an output signal thereof; a first mixer for multiplying the output signal from the first LIA by a signal output from the second LPF; and a second mixer for multiplying the output signal from the second LIA by a signal output from the first LPF.

12 Claims, 10 Drawing Sheets

OTHER PUBLICATIONS

European Search Report dated May 15, 2009 in corresponding European Application No. 08016438.7.
Extended European Search Report dated Jan. 19, 2010 and issued in corresponding European Patent Application 09173264.4.
May 16, 2011 Office Action (Restriction Requirement) in co-pending U.S. Appl. No. 12/230,791.
Jun. 22, 2011 Office Action in co-pending U.S. Appl. No. 12/230,791.
Nov. 21, 2011 Office Action (Notice of Allowance) in co-pending U.S. Appl. No. 12/230,791.
U.S. Appl. No. 12/230,791, filed Sep. 4, 2008, Yuichi Akiyama, Fujitsu Limited.

* cited by examiner

DQPSK OPTICAL RECEIVER

CROSS-REFERENCE TO RELATED APPLICATIONS

This application is based upon and claims the benefits of priority from the prior Japanese Patent Application No. 2007-310148 filed Nov. 30, 2007, the entire contents of which are incorporated herein by reference.

This application also claims the benefit under 35 U.S.C. §120 of U.S. patent application Ser. No. 12/230,791 entitled DQPSK OPTICAL RECEIVER and filed Sep. 4, 2008, now allowed, which is incorporated by reference in its entirety in this application.

BACKGROUND

1. Field

The embodiments relate to DQPSK optical receivers, and more particularly, to a DQPSK optical receiver for receiving and demodulating a Differential Quadrature Phase Shift Keying (DQPSK)-modulated optical signal.

2. Description of the Related Art

In recent years, there has been an increasing demand for introduction of next-generation 40-Gbit/s optical transmission systems. Next-generation optical transmission systems are required to provide transmission distance and frequency utilization efficiency equivalent to those achieved by 10-Gbit/s optical transmission systems.

As a means to implement next-generation optical transmission systems, novel modulation schemes are currently under study, and the adoption of DQPSK modulation scheme is actively investigated because this scheme is superior to conventional modulation schemes such as the NonReturn-to-Zero (NRZ) scheme in that the spectral width of the signal is half and also in respect of frequency utilization efficiency, chromatic dispersion tolerance, and device transparency.

A receiver of an optical transmission system employing the DQPSK modulation scheme is equipped with a pair of Mach-Zehnder interferometers associated with A (I) and B (Q) arms, respectively. Each Mach-Zehnder interferometer has an optical delay of $\tau$ corresponding to the symbol time of the optical transmission system. Also, to provide an optical phase difference between the two interferometers, the phases of the A and B arms are set to "$\pi/4$" and "$-\pi/4$", respectively. Two output terminals of each interferometer are connected to an optical receiving circuit for performing optical-electrical conversion, and the optical receiving circuit is followed by a clock and data recovery circuit for distinguishing between "0" and "1" of the electrical signal supplied thereto.

In this receiver, in order to secure the required signal characteristic, the optical phase difference between the two interferometers needs to be set with accuracy, that is, the phases of the two arms need to be accurately controlled to "$\pi/4$" and "$-\pi/4$", respectively. To meet the requirement, it is essential to employ feedback control. As one of such feedback control techniques, feedback control has been known which uses branch signals derived from the stage succeeding the A- and B-arm optical receiving circuits as well as branch signals derived from the stage succeeding the A- and B-arm clock and data recovery circuits (see, e.g., Japanese Unexamined Patent Publication No. 2007-20138).

In DQPSK optical receivers, individual parts are often fabricated as modules to facilitate the maintenance and management of the receivers. In FIG. 1 of Japanese Unexamined Patent Publication No. 2007-20138, for example, it is conceivable that the balanced detectors 110 and 113 are unified into a module and that the clock and data recovery circuits 111 and 114 are also unified into a module.

The receiver architecture generally differs from equipment. For example, in FIG. 1 of Japanese Unexamined Patent Publication No. 2007-20138, the clock and data recovery circuits 111 and 114 may be incorporated into signal processing circuits succeeding the clock and data recovery circuits so that the clock and data recovery circuits and the signal processing circuits may constitute a single module.

To reduce the cost and size of receivers, branch points for the feedback control (points where the signals output from the optical receiving circuits and those output from the clock and data recovery circuits are branched) should preferably exist in a single unit. It is conceivable, therefore, that the feedback signals are derived from points other than the output side of the clock and data recovery circuits.

For example, in FIG. 1 of Japanese Unexamined Patent Publication No. 2007-20138, the mixer 120 may be input with the signal 124 instead of the signal 125, and the mixer 116 may be input with the signal 128 instead of the signal 129. This makes it possible for the branch points for the feedback control to exist in the same module comprising the balanced detectors 110 and 113. Even in cases where the clock and data recovery circuits 111 and 114 are incorporated into a separate module, leads for the feedback signals can always be extended from the module of the balanced detectors 110 and 113.

Where the signals not derived from the clock and data recovery circuits are used as the feedback signals, however, the feedback signals become deviated from optimum phase of the interferometers, giving rise to a problem that the signal characteristic is deteriorated.

SUMMARY

The present invention was created in view of the above circumstances, and an object thereof is to provide a DQPSK optical receiver capable of properly carrying out feedback control without the need for signals fed back from clock and data recovery circuits.

To achieve the object, there is provided a DQPSK optical receiver for receiving and demodulating a DQPSK-modulated optical signal. The DQPSK optical receiver comprises a first interferometer associated with a first arm, a second interferometer associated with a second arm, a first optical-electrical converter for converting an optical signal output from the first interferometer to an electrical signal, a second optical-electrical converter for converting an optical signal output from the second interferometer to an electrical signal, a first low pass filter connected to a line branching off from between the first optical-electrical converter and a first clock and data recovery circuit, a second low pass filter connected to a line branching off from between the second optical-electrical converter and a second clock and data recovery circuit, a first limiting amplifier for amplifying a signal output from the first low pass filter and also limiting an amplitude of an output signal thereof, a second limiting amplifier for amplifying a signal output from the second low pass filter and also limiting an amplitude of an output signal thereof, a first mixer for multiplying the output signal from the first limiting amplifier by a signal output from the second low pass filter, and a second mixer for multiplying the output signal from the second limiting amplifier by a signal output from the first low pass filter.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
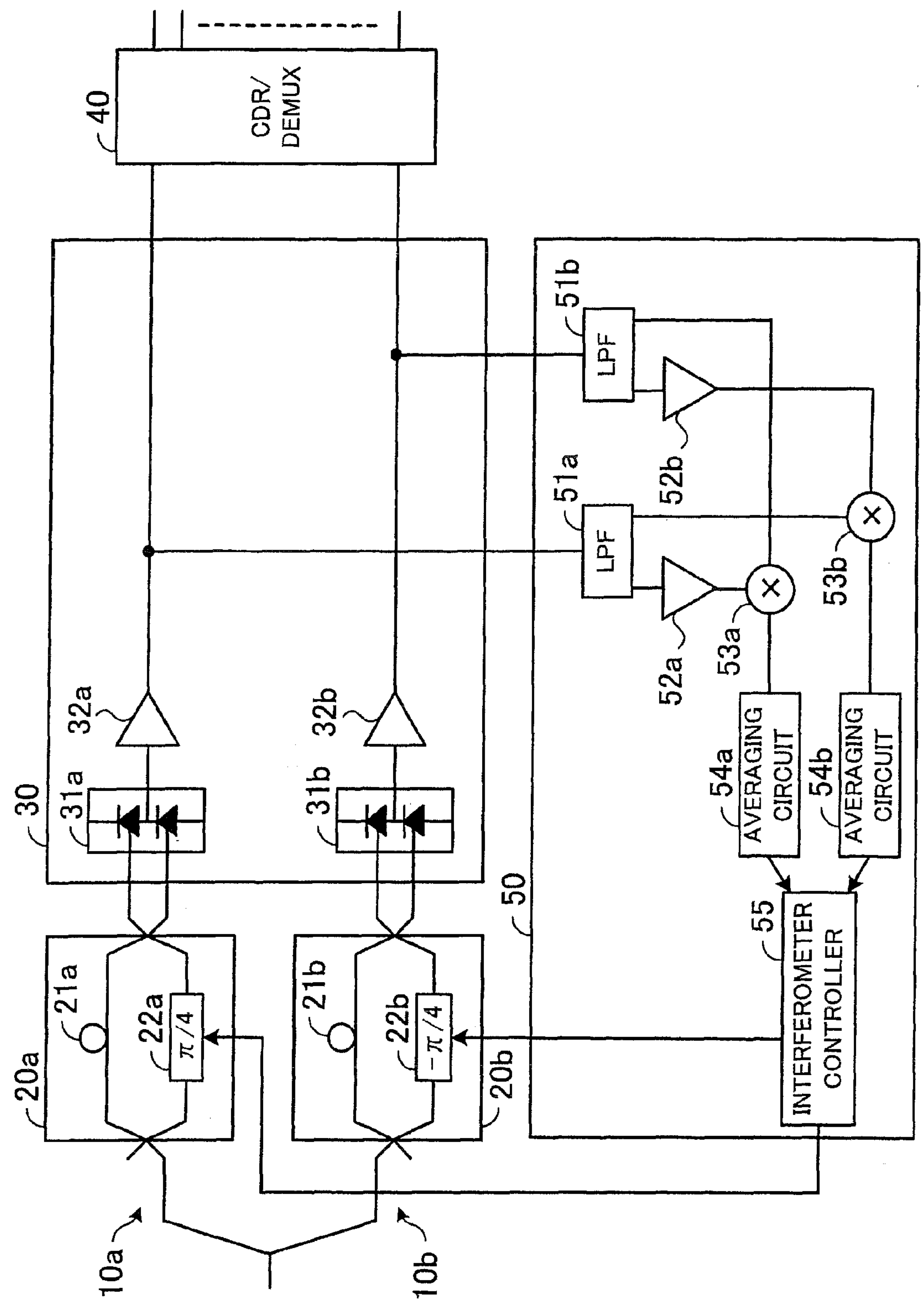
FIG. 1 is a block diagram of a DQPSK optical receiver according to a first embodiment.

Preferred embodiments of the present invention will be described in detail below with reference to the accompanying drawings, wherein like reference numerals refer to like elements throughout.

FIG. 1 is a block diagram of a DQPSK optical receiver according to a first embodiment. As illustrated, the DQPSK optical receiver comprises Mach-Zehnder interferometers 20*a* and 20*b* associated with A and B arms 10*a* and 10*b*, respectively, a front-end module 30, a Clock and data recovery (CDR)/Demultiplexer (DEMUR) 40, and a controller 50. The DQPSK optical receiver is input, for example, with a DQPSK-modulated 40-Gbit/s optical signal.

The Mach-Zehnder interferometers 20*a* and 20*b* respectively include optical delay elements 21*a* and 21*b*, and phase shifting elements 22*a* and 22*b* (in FIG. 1, π/4 and −π/4). The optical delay elements 21*a* and 21*b* each delay the received optical signal for one symbol time. In DQPSK, 2-bit data is transmitted per symbol, and therefore, one symbol time is equivalent to twice the reciprocal of the transmission rate.

The phase shifting element 22*a* shifts the phase of the optical signal by π/4, and the phase shifting element 22*b* shifts the phase of the optical signal by −π/4. The phase shift amounts of the respective phase shifting elements 22*a* and 22*b* can be adjusted by the controller 50.

The front-end module 30 is a module for converting the optical signals to respective electrical signals and includes balanced detectors 31*a* and 31*b* and Transimpedance Amplifiers (TIAs) 32*a* and 32*b*.

The balanced detector 31*a* has two photodiodes input with the respective optical signals output from the Mach-Zehnder interferometer 20*a*. These two photodiodes generate currents corresponding to the input power levels of the respective optical signals, and output the difference between the generated currents to the TIA 32*a*. Like the balanced detector 31*a*, the balanced detector 31*b* has two photodiodes for generating currents corresponding to the input power levels of the respective optical signals output from the Mach-Zehnder interferometer 20*b* and outputting the difference between the generated currents to the TIA 32*b*.

The TIAs 32*a* and 32*b* convert the differences between the currents, output from the respective balanced detectors 31*a* and 31*b*, to voltages.

The CDR/DEMUX 40 is a module for recovering the received signals. For example, the CDR/DEMUX 40 includes clock and data recovery circuits (CDR circuits) associated with the A and B arms 10*a* and 10*b*, respectively, for distinguishing between "0" and "1" of the signals output from the respective TIAs 32*a* and 32*b* to obtain digital data. Based on the digital data obtained by the clock and data recovery circuits, the CDR/DEMUX 40 recovers signals, for example, 2.5 Gbit/s×16 or 10 Gbit/s×4 data signals.

The Mach-Zehnder interferometers 20*a* and 20*b* correspond, for example, to the Mach-Zehnder interferometers 104 and 107 illustrated in FIG. 1 of Japanese Unexamined Patent Publication No. 2007-20138, and the balanced detectors 31*a* and 31*b* of the front-end module correspond to the balanced detectors 110 and 113 illustrated in the same figure. Also, for the CDR/DEMUX 40, a device commonly known in the art may be used. The clock and data recovery circuits included in the CDR/DEMUX 40 correspond to the clock and data recovery circuits 111 and 114 illustrated in FIG. 1 of Japanese Unexamined Patent Publication No. 2007-20138. In the following, the controller 50 will be described in detail.

The controller 50 feeds the output signals from the TIAs 32*a* and 32*b* of the front-end module 30 back to the Mach-Zehnder interferometers to control the optical phase shifts of the A and B arms 10*a* and 10*b* to "π/4" and "−π/4", respectively. The controller 50 includes LPFs (Low Pass Filters) 51*a* and 51*b*, LIAs (Limiting Amplifiers) 52*a* and 52*b*, mixers 53*a* and 53*b*, averaging circuits 54*a* and 54*b*, and an interferometer controller 55.

The LPF 51*a* is connected to a line branching off from between the balanced detector 31*a* associated with the A arm 10*a* and the CDR/DEMUX 40. The LPF 51*b* is connected to a line branching off from between the balanced detector 31*b* associated with the B arm 10*b* and the CDR/DEMUX 40. Namely, the feedback signals are input to the controller in a direct manner and not via the clock and data recovery circuits.

The LPFs 51*a* and 51*b* cut off high-frequency components of the electrical signals of the A and B arms 10*a* and 10*b*, respectively, output from the TIAs 32*a* and 32*b*. The cutoff frequency of the LPFs 51*a* and 51*b* is, for example, 100 MHz. The LPF 51*a* cuts off high-frequency components of the electrical signal from the TIAs 32*a* and outputs (distributes) the signal to the LIA 52*a* and the mixer 53*b*. The LPF 51*b* cuts off high-frequency components of the electrical signal from the TIAs 32*b* and outputs the signal to the LIA 52*b* and the mixer 53*a*.

The LIAs 52*a* and 52*b* amplify the signals output from the respective LPFs 51*a* and 51*b*, and output the resulting signals while limiting the amplitudes of their respective amplified signals.

The mixer 53*a* multiplies the signal output from the LIA 52*a* by the signal output from the LPF 51*b*, and the mixer 53*b* multiplies the signal output from the LIA 52*b* by the signal output from the LPF 51*a*.

The averaging circuits 54*a* and 54*b* average the signals output from the respective mixers 53*a* and 53*b*, and output the resulting signals. The averaging circuits 54*a* and 54*b* are each constituted, for example, by an LPF.

The interferometer controller 55 controls the phase shifting elements 22*a* and 22*b* in accordance with the signals output from the averaging circuits 54*a* and 54*b*. The averaging circuits 54*a* and 54*b* output positive or negative signals (voltages) corresponding to the phase lead or lag of the respective phase shifting elements 22*a* and 22*b*, and the interferometer controller 55 controls the phase shifting elements 22*a* and 22*b* so that the signals output from the averaging circuits 54*a* and 54*b* may become proximity "0".

The mixers 53*a* and 53*b*, the averaging circuits 54*a* and 54*b*, and the interferometer controller 55 correspond, for example, to the mixers 116 and 120, the averaging sections 117 and 121, and the phase adjusting sections 119 and 123 (including the inverting circuit 122), respectively, illustrated in FIG. 1 of Japanese Unexamined Patent Publication No. 2007-20138.

FIGS. 2A to 2D illustrate the function of the LIA. The LIAs 52*a* and 52*b* have the same function; therefore, the function of the LIA 52*a* alone will be explained below.

Figure 2A:
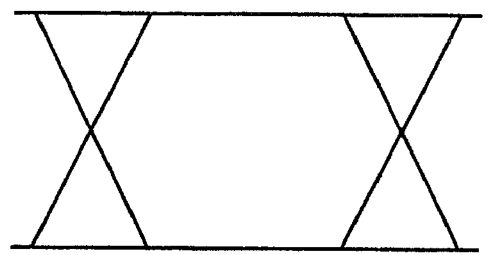
FIGS. 2A to 2D illustrate the function of an LIA.
Figure 2B:
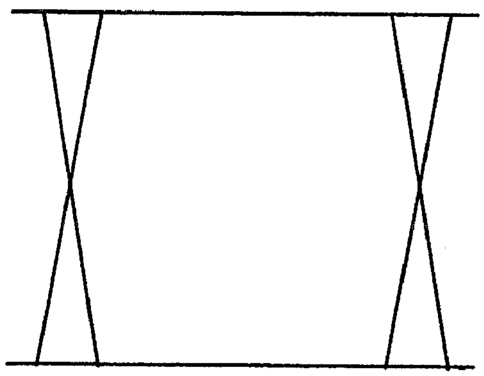
Figure 2C:
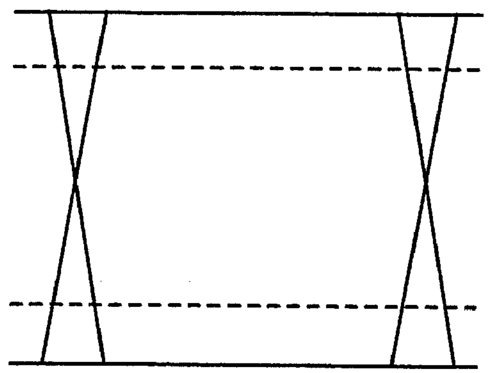
Figure 2D:
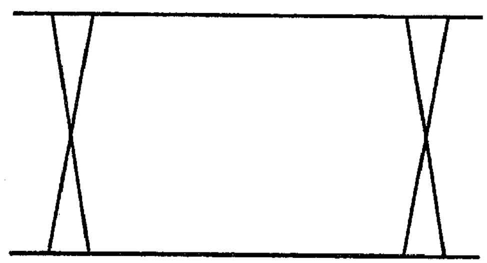

FIG. 2A illustrates a typical signal waveform (I pattern) input to the LIA 52*a*, FIG. 2B illustrates a signal waveform of the signal amplified by the LIA 52*a*, FIG. 2C illustrates how the amplitude of the amplified signal is limited by the LIA 52*a*, and FIG. 2D illustrates a signal waveform obtained as a result of the amplitude limiting by the LIA 52*a*.

The LIA 52*a* is input with a signal as illustrated in FIG. 2A, and amplifies the input signal as illustrated in FIG. 2B.

Then, the LIA 52*a* limits the amplitude of the amplified signal by cutting off its upper and lower portions, as indicated by the dashed lines in FIG. 2C, and outputs an amplified yet amplitude-limited signal as illustrated in FIG. 2D.

The signal input to the LIA 52*a* rises and falls gently and also contains various noise components. However, since the LIA 52*a* amplifies the input signal and also limits the amplitude of the amplified signal by cutting off its upper and lower portions, the rise and fall of the input signal can be steepened, making the distinction between "0" and "1" of the signal clearer and removing unnecessary noise components. Namely, the LIA 52*a* serves to shape the signal waveform.

Thus, in the DQPSK optical receiver of FIG. 1, it is unnecessary to derive digital signals from the stage succeeding the clock and data recovery circuits; instead, the LIAs 52*a* and 52*b* shape the waveforms of the analog signals respectively output from the TIAs 32*a* and 32*b* such that the distinction between "0" and "1" of the signals becomes clear. It is therefore possible to accurately control the optical phase shifts of the A and B arms 10*a* and 10*b*, as in the case of obtaining the feedback signals from the stage succeeding the clock and data recovery circuits.

Also, in the DQPSK optical receiver of FIG. 1, the controller 50 need not derive signals from the stage succeeding the clock and data recovery circuits incorporated in the CDR/DEMUX 40 and may obtain signals from the stage succeeding the balanced detectors 31*a* and 31*b*. Namely, whichever module the clock and data recovery circuits are incorporated into, leads for the feedback signals can always be drawn from the front-end module 30, and therefore, the present invention can be applied to DQPSK optical receivers with a variety of different configurations.

Figure 3:
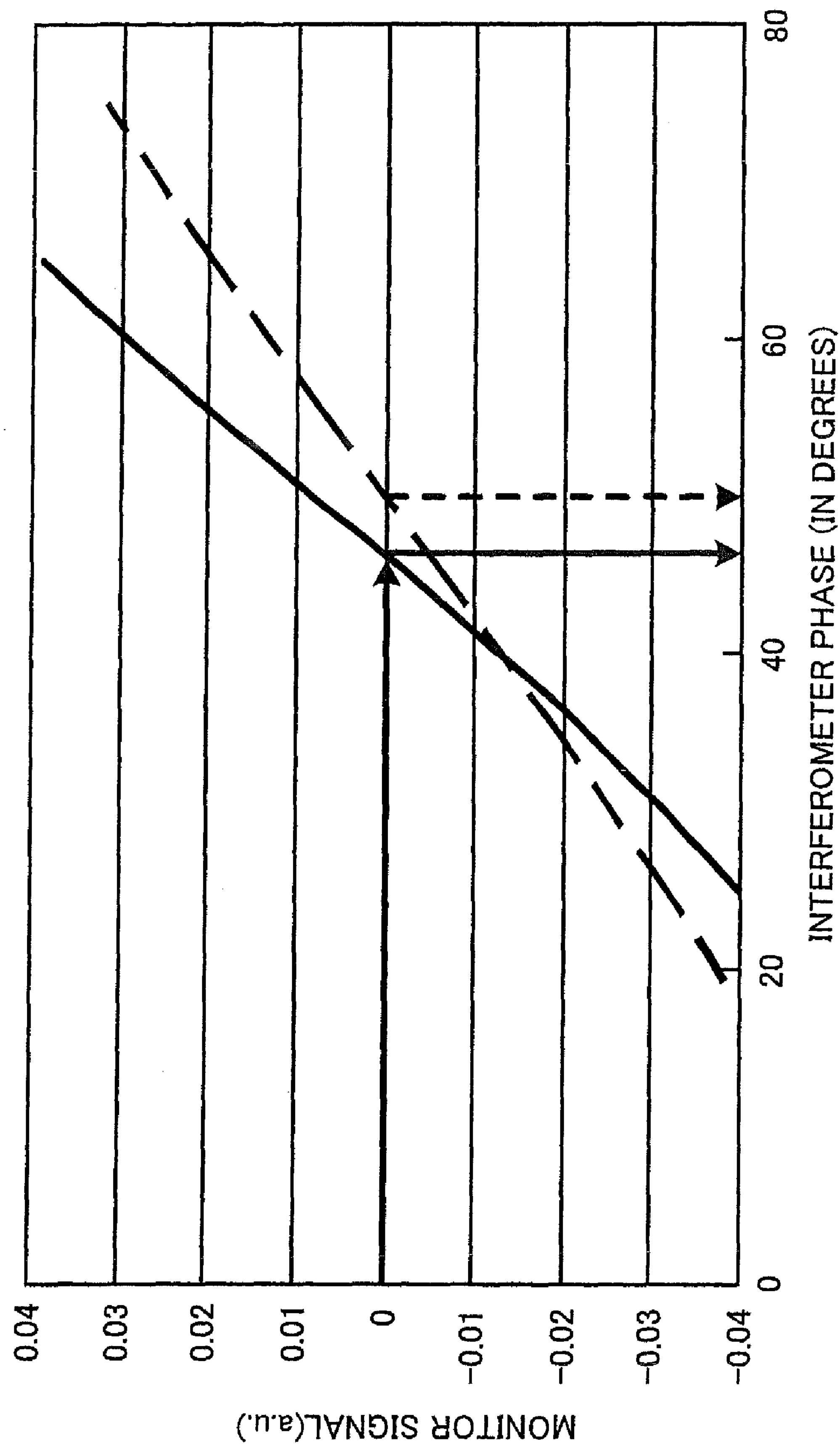
FIG. 3 illustrates simulation results for monitor signal versus interferometer phase.

FIG. 3 illustrates the simulation results, wherein the horizontal axis represents the phase of the phase shifting element 22*a* and the vertical axis represents the intensity of a monitor signal output from the averaging circuit 54*a*. In the graph, the solid curve indicates the simulation result obtained with the DQPSK optical receiver illustrated in FIG. 1, and the dashed curve indicates the simulation result obtained with a DQPSK optical receiver identical with that illustrated in FIG. 1 except that the LIAs 52*a* and 52*b* are omitted.

The feedback control should desirably be performed in such a manner that when the voltage output from the averaging circuit 54*a* is proximity "0", the phase of the phase shifting element 22*a* is $\pi/4$ (45 degrees). In the case of the DQPSK optical receiver of FIG. 1, when the voltage of the monitor signal is proximity "0", the phase of the phase shifting element 22*a* is $\pi/4$, as indicated by the solid curve in FIG. 3.

Where the LIAs 52*a* and 52*b* are omitted from the DQPSK optical receiver illustrated in FIG. 1, on the other hand, when the voltage of the monitor signal is proximity "0", the phase of the phase shifting element 22*a* is not equal to $\pi/4$, as indicated by the dashed curve in FIG. 3. As a consequence, when the interferometer 20*a* is controlled by the interferometer controller 55 so that the voltage output from the averaging circuit 54*a* may become proximity "0", the phase of the phase shifting element 22*a* is controlled to a value different from $\pi/4$, as indicated by the dashed arrow in FIG. 3.

In this manner, the waveforms of the signals derived from the stage preceding the clock and data recovery circuits are shaped by the respective LIAs 52*a* and 52*b* for the purpose of feedback control, and accordingly, the feedback control can be properly carried out.

Also, since the feedback signals are diverged from front side of the clock and data recovery circuits, leads for the feedback signals can be extended from a single module, making it possible to reduce the cost and size of the optical receiver.

Further, since the feedback signals are obtained from the stage preceding the clock and data recovery circuits, the present invention can be applied to DQPSK optical receivers with a variety of different module configurations.

Because the LIAs 52*a* and 52*b* are low-speed, it is possible to reduce costs.

Also, the LPF 51*a* outputs the signal to the LIA 52*a* and the mixer 53*b*, and the LPF 51*b* outputs the signal to the LIA 52*b* and the mixer 53*a*. Accordingly, two branch points suffice for deriving the feedback signals.

A second embodiment of the present invention will be now described in detail. In the first embodiment, one signal line is extended from each of the A and B arms and connected to the corresponding LPF, the output of which is distributed to the LIA and the mixer. In the second embodiment, two signal lines are extended from each of the A and B arms and connected to respective LPFs. LIAs are connected to the outputs of the LPFs.

Figure 4:
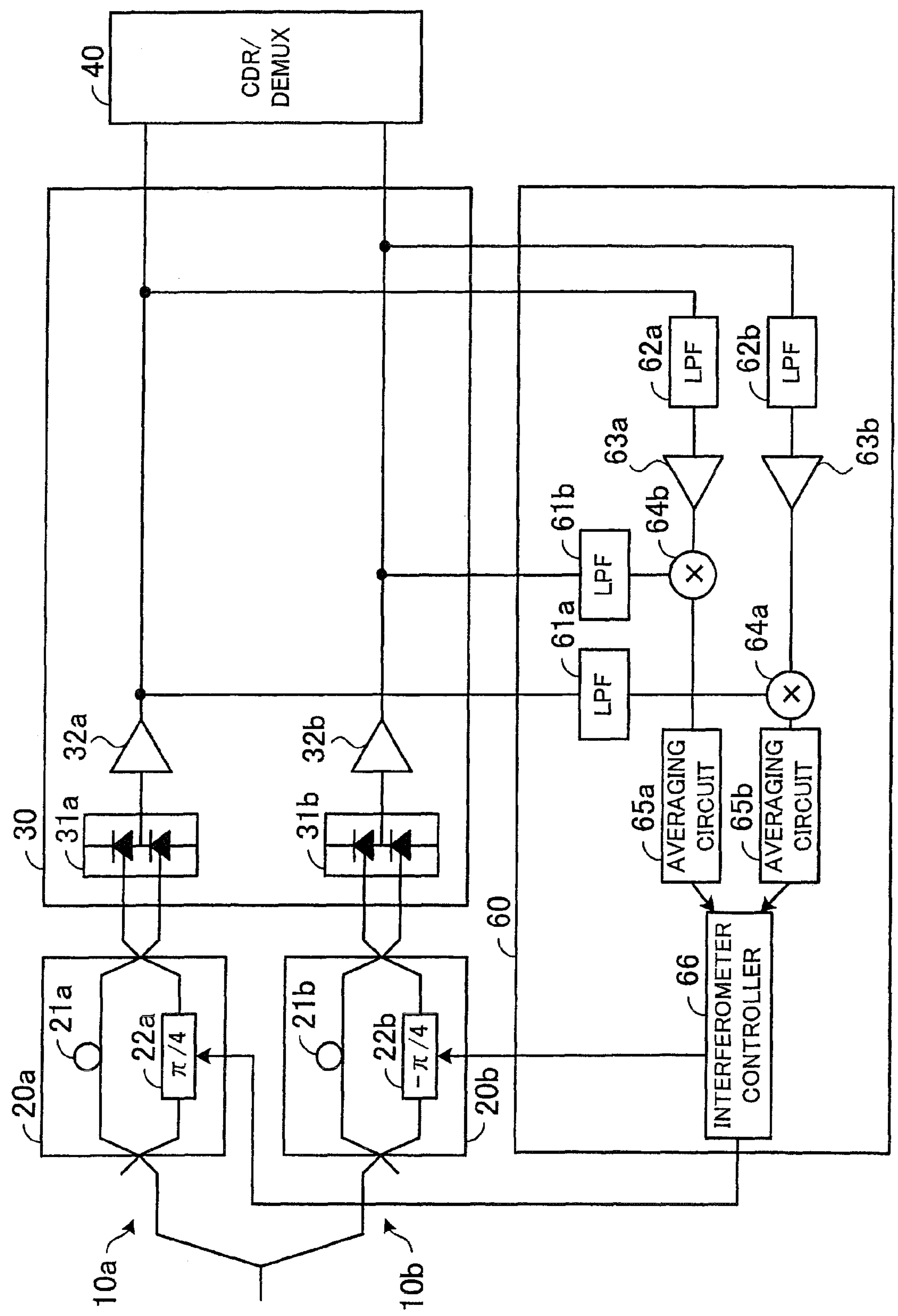
FIG. 4 is a block diagram of a DQPSK optical receiver according to a second embodiment.

FIG. 4 is a block diagram of a DQPSK optical receiver according to the second embodiment. In FIG. 4, like reference numerals are used to denote like elements already explained above with reference to FIG. 1, and description of such elements is omitted. The DQPSK optical receiver illustrated in FIG. 4 differs from the counterpart illustrated in FIG. 1 in the points from which the feedback signals are diverged as well as in the configuration of a controller 60.

As illustrated in FIG. 4, the controller 60 includes LPFs 61*a*, 61*b*, 62*a* and 62*b*, LIAs 63*a* and 63*b*, mixers 64*a* and 64*b*, averaging circuits 65*a* and 65*b*, and an interferometer controller 66. The averaging circuits 65*a* and 65*b* and the interferometer controller 66 are respectively identical with the averaging circuits 54*a* and 54*b* and the interferometer controller 55 illustrated in FIG. 1.

The LPFs 61*a* and 62*a* are each connected to a line branching off from between the balanced detector 31*a* of the A arm 10*a* and the CDR/DEMUX 40. The LPFs 61*b* and 62*b* are each connected to a line branching off from between the balanced detector 31*b* of the B arm 10*b* and the CDR/DEMUR 40. Namely, the feedback signals are input to the controller 60 in a direct manner and not via the clock and data recovery circuits.

The LPF 61*a* is input with the signal of the A arm 10*a* output from the TIA 32*a*, and the LPF 61*b* is input with the signal of the B arm 10*b* output from the TIA 32*b*. The LPF 62*a* is input with the signal of the A arm 10*a* output from the TIA

32*a*, and the LPF 62*b* is input with the signal of the B arm 10*b* output from the TIA 32*b*. The LPFs 61*a*, 61*b*, 62*a* and 62*b* have the same function as that of the LPFs 51*a* and 51*b* illustrated in FIG. 1, and the cutoff frequency thereof is, for example, 100 MHz.

The LIAs 63*a* and 63*b* are input with signals output from the respective LPFs 62*a* and 62*b*. The LIAs 63*a* and 63*b*, which have the same function as that of the LIAs 52*a* and 52*b* illustrated in FIG. 1, amplify the signals output from the respective LPFs 62*a* and 62*b* and also limit the amplitudes of the respective amplified signals.

The mixer 64*a* multiplies the signal output from the LPF 61*a* by the signal output from the LIA 63*b*, and the mixer 64*b* multiplies the signal output from the LPF 61*b* by the signal output from the LIA 63*a*.

Thus, in the DQPSK optical receiver of FIG. 4, it is unnecessary to derive digital signals from the stage succeeding the clock and data recovery circuits; instead, the LIAs 63*a* and 63*b* shape the waveforms of the analog signals respectively output from the TIAs 32*a* and 32*b* such that the distinction between "0" and "1" of the signals becomes clear. It is therefore possible to accurately control the optical phase shifts of the A and B arms 10*a* and 10*b*, as in the case of obtaining the feedback signals from the stage succeeding the clock and data recovery circuits.

The DQPSK optical receivers illustrated in FIGS. 4 and 1 differ from each other only in their configuration and have the same function. Accordingly, the simulation result obtained with the controller 60 of the DQPSK optical receiver illustrated in FIG. 4 is identical with the one illustrated in FIG. 3.

In this manner, the waveforms of the signals diverged from front side of the clock and data recovery circuits are shaped by the LIAs 63*a* and 63*b*, and accordingly, the feedback control can be properly performed.

A third embodiment of the present invention will be now described in detail with reference to the drawings. The third embodiment differs from the second embodiment in that an EDC (Electric Dispersion Compensation) is connected to the output of each TIA.

Figure 5:
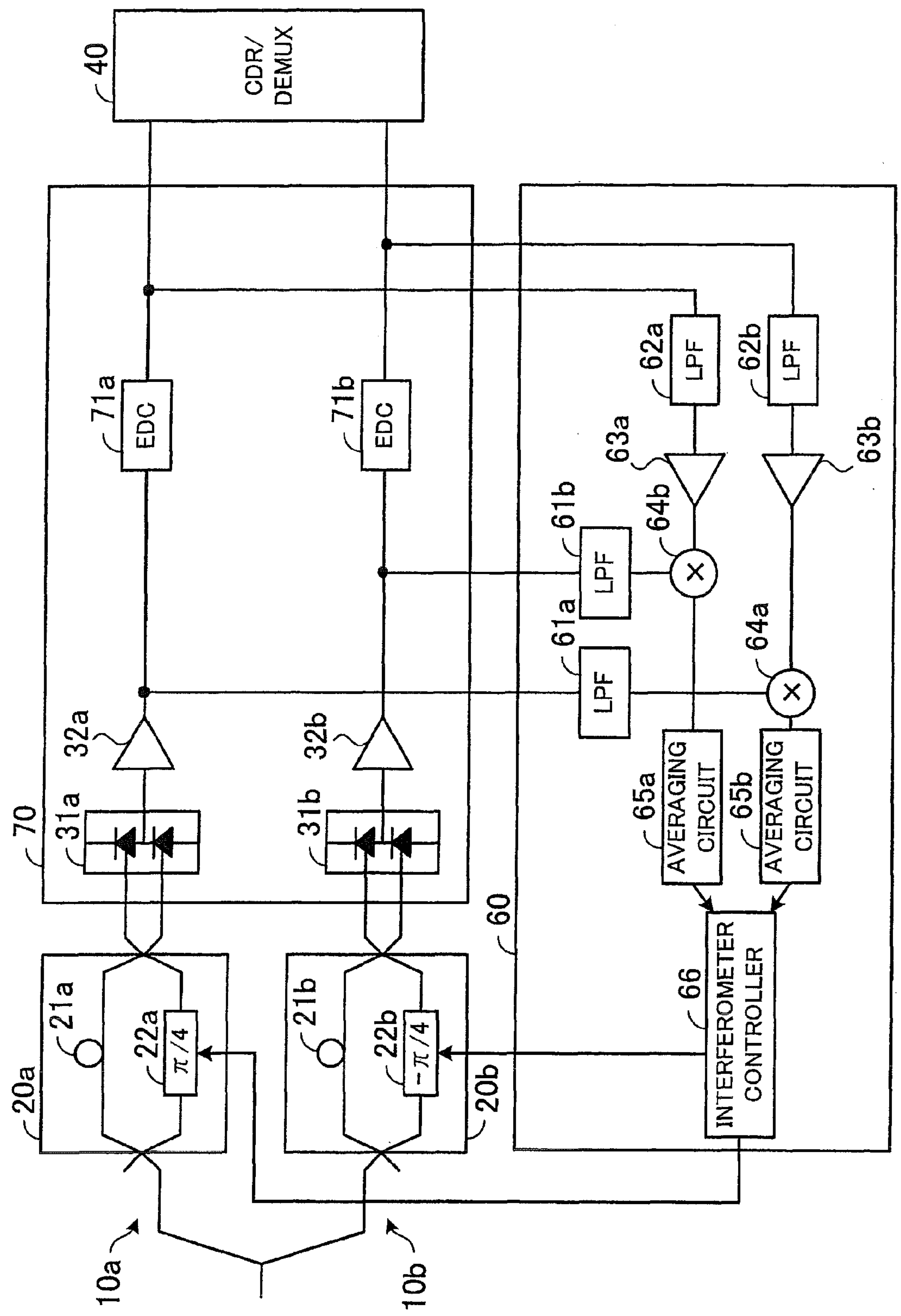
FIG. 5 is a block diagram of a DQPSK optical receiver according to a third embodiment.

FIG. 5 is a block diagram of a DQPSK optical receiver according to the third embodiment. In FIG. 5, like reference numerals are used to denote like elements also appearing in FIG. 4, and description of such elements is omitted. The DQPSK optical receiver illustrated in FIG. 5 differs from the counterpart illustrated in FIG. 4 in the configuration of a front-end module 70.

The front-end module 70 additionally includes EDCs 71*a* and 71*b*. The EDC 71*a* is connected between the branch points to which the LPFs 61*a* and 62*a* of the A arm 10*a* are respectively connected. The EDC 71*b* is connected between the branch points to which the LPFs 61*b* and 62*b* of the B arm 10*b* are respectively connected.

Each of the EDCs 71*a* and 71*b* is a device for electrically compensating for optical dispersion. Deteriorated signals by chromatic dispersions in the transmission are electrically compensated for by the EDCs 71*a* and 71*b*, respectively, and the resulting signals are output to the CDR/DEMUX 40.

The LPFs 61*a* and 61*b* of the controller 60 are input with the signals output and branched from the respective TIAs 32*a* and 32*b*, like the counterparts illustrated in FIG. 4. However, the LPFs 62*a* and 62*b* are input with the signals output and branched from the respective EDCs 71*a* and 71*b*. The LPFs 62*a* and 62*b* are thus input with the signals obtained via the EDCs 71*a* and 71*b*, respectively, and also in this case, the controller 60 can properly control the phases of the phase shifting elements 22*a* and 22*b*.

Figure 6:
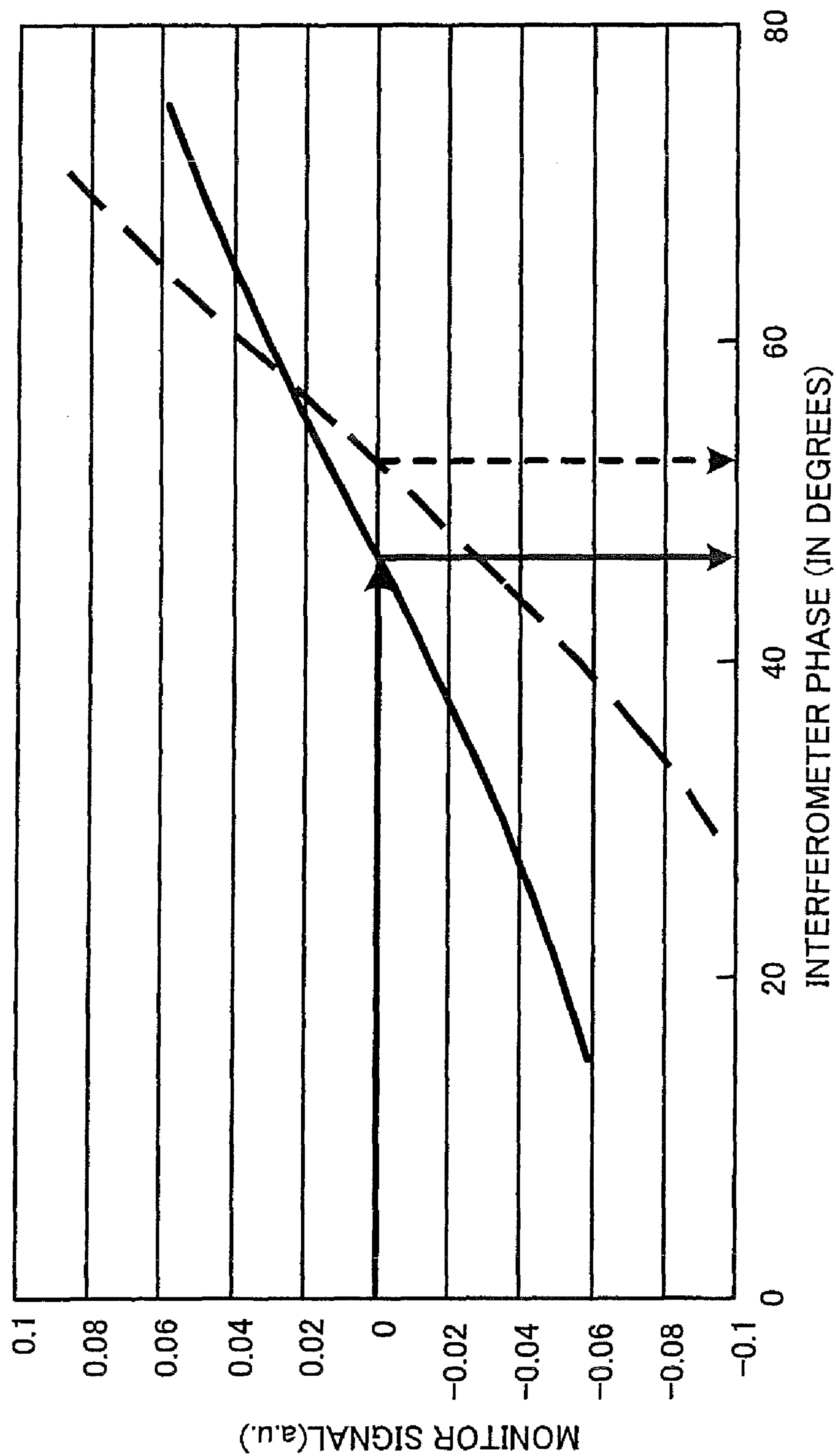
FIG. 6 illustrates simulation results for monitor signal versus interferometer phase.

FIG. 6 illustrates the simulation results, wherein the horizontal axis represents the phase of the phase shifting element 22*a* while the vertical axis represents the voltage of a monitor signal output from the averaging circuit 65*a*. In the graph, the solid curve indicates the simulation result obtained with the DQPSK optical receiver illustrated in FIG. 5, and the dashed curve indicates the simulation result obtained with a DQPSK optical receiver identical with that illustrated in FIG. 5 except that the LIAs 63*a* and 63*b* are omitted.

The controller 60 controls the Mach-Zehnder interferometers so that the voltages output from the averaging circuits 65*a* and 65*b* may become "0". Thus, the feedback control should desirably be performed in such a manner that when the voltage output from the averaging circuit 65*a* is proximity "0", the phase of the phase shifting element 22*a* is $\pi/4$ (45 degrees). In the case of the DQPSK optical receiver of FIG. 5, when the voltage of the monitor signal is proximity "0", the phase of the phase shifting element 22*a* is $\pi/4$, as indicated by the solid curve in FIG. 6.

Where the LIAs 63*a* and 63*b* are omitted from the DQPSK optical receiver illustrated in FIG. 5, on the other hand, when the voltage of the monitor signal is "0", the phase of the phase shifting element 22*a* is not equal to $\pi/4$, as indicated by the dashed curve in FIG. 6. As a consequence, when the interferometer 20*a* is controlled by the interferometer controller 66 so that the voltage output from the averaging circuit 65*a* may become "0", the phase of the phase shifting element 22*a* is controlled to a value different from $\pi/4$, as indicated by the dashed arrow in FIG. 6.

Thus, also in the case where the deteriorated signals by chromatic dispersions in the transmission have been electrically compensated for by the EDCs 71*a* and 71*b* are used as the feedback signals, the feedback control can be properly carried out.

A fourth embodiment of the present invention will be now described in detail. The fourth embodiment differs from the third embodiment in that an LIA is connected to the output of each EDC.

Figure 7:
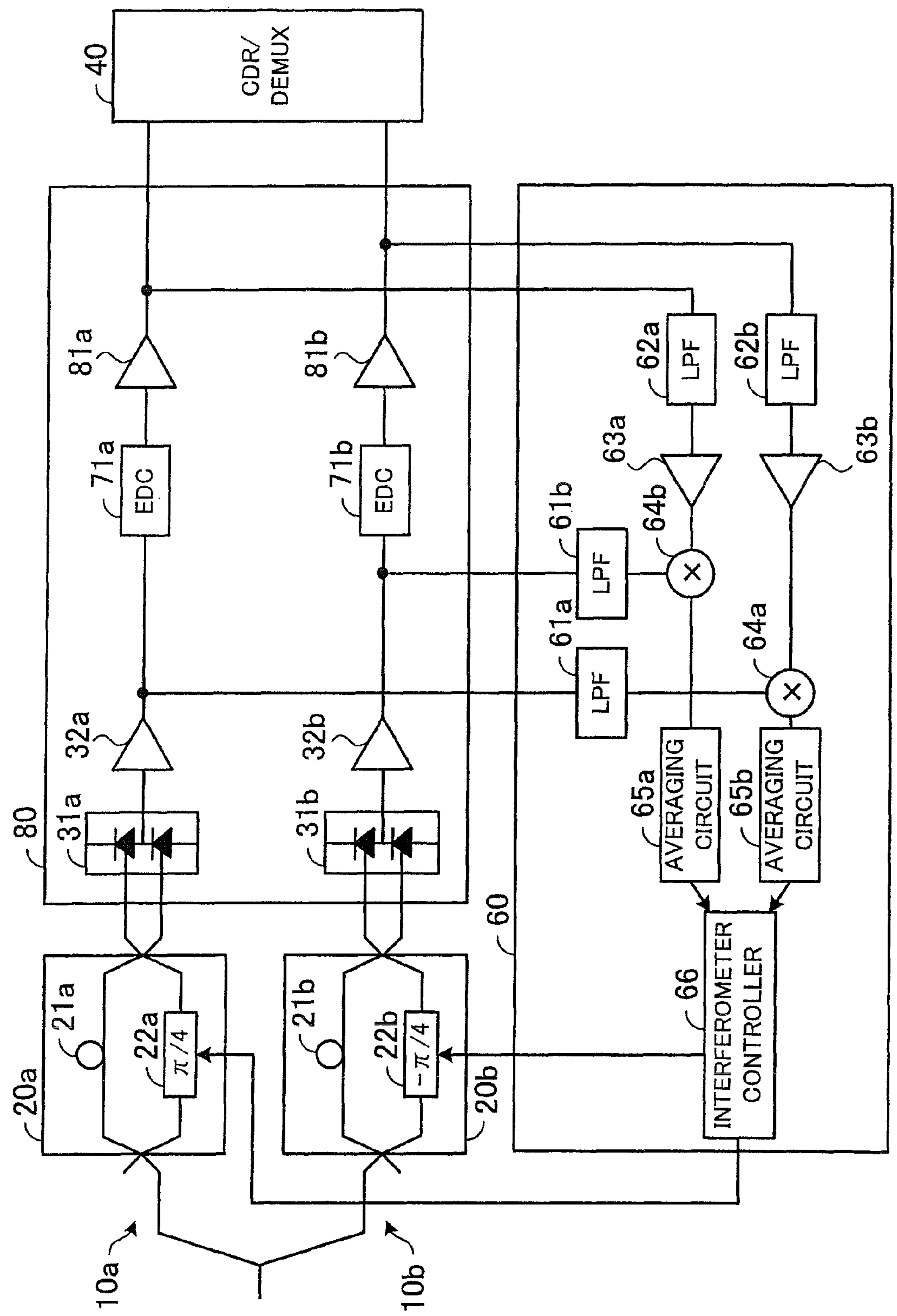
FIG. 7 is a block diagram of a DQPSK optical receiver according to a fourth embodiment.

FIG. 7 is a block diagram of a DQPSK optical receiver according to the fourth embodiment. In FIG. 7, like reference numerals are used to denote like elements also appearing in FIG. 5, and description of such elements is omitted. The DQPSK optical receiver illustrated in FIG. 7 differs from the counterpart illustrated in FIG. 5 in the configuration of a front-end module 80.

Compared with the front-end module 70 illustrated in FIG. 5, the front-end module 80 further includes LIAs 81*a* and 81*b*. The LIA 81*a* is connected between the branch points to which the LPFs 61*a* and 62*a* of the A arm 10*a* are respectively connected. The LIA 81*b* is connected between the branch points to which the LPFs 61*b* and 62*b* of the B arm 10*b* are respectively connected.

Like the LIAs 63*a* and 63*b*, the LIAs 81*a* and 81*b* amplify the signals respectively output from the EDCs 71*a* and 71*b* and also limit the amplitudes of the respective amplified signals. Thus, the waveform-shaped signals are output to the CDR/DEMUX 40 and the respective LPFs 62*a* and 62*b*.

Since the LIAs 81*a* and 81*b* are used for the amplification and amplitude limiting of the main signals, however, it is necessary to employ LIAs capable of operating at a higher speed than the LIAs 63*a* and 63*b* used for the amplification and amplitude limiting of the signals output from the respective LPFs 62*a* and 62*b*.

Also in the case where the LIAs 81*a* and 81*b* are connected to the outputs of the respective EDCs 71*a* and 71*b*, it is possible to properly perform the feedback control.

A fifth embodiment of the present invention will be now described in detail. The fifth embodiment differs from the fourth embodiment in that LIAs are connected between the respective branch points, from which the feedback signals are distributed to the controller, and the CDR/DEMUX.

Figure 8:
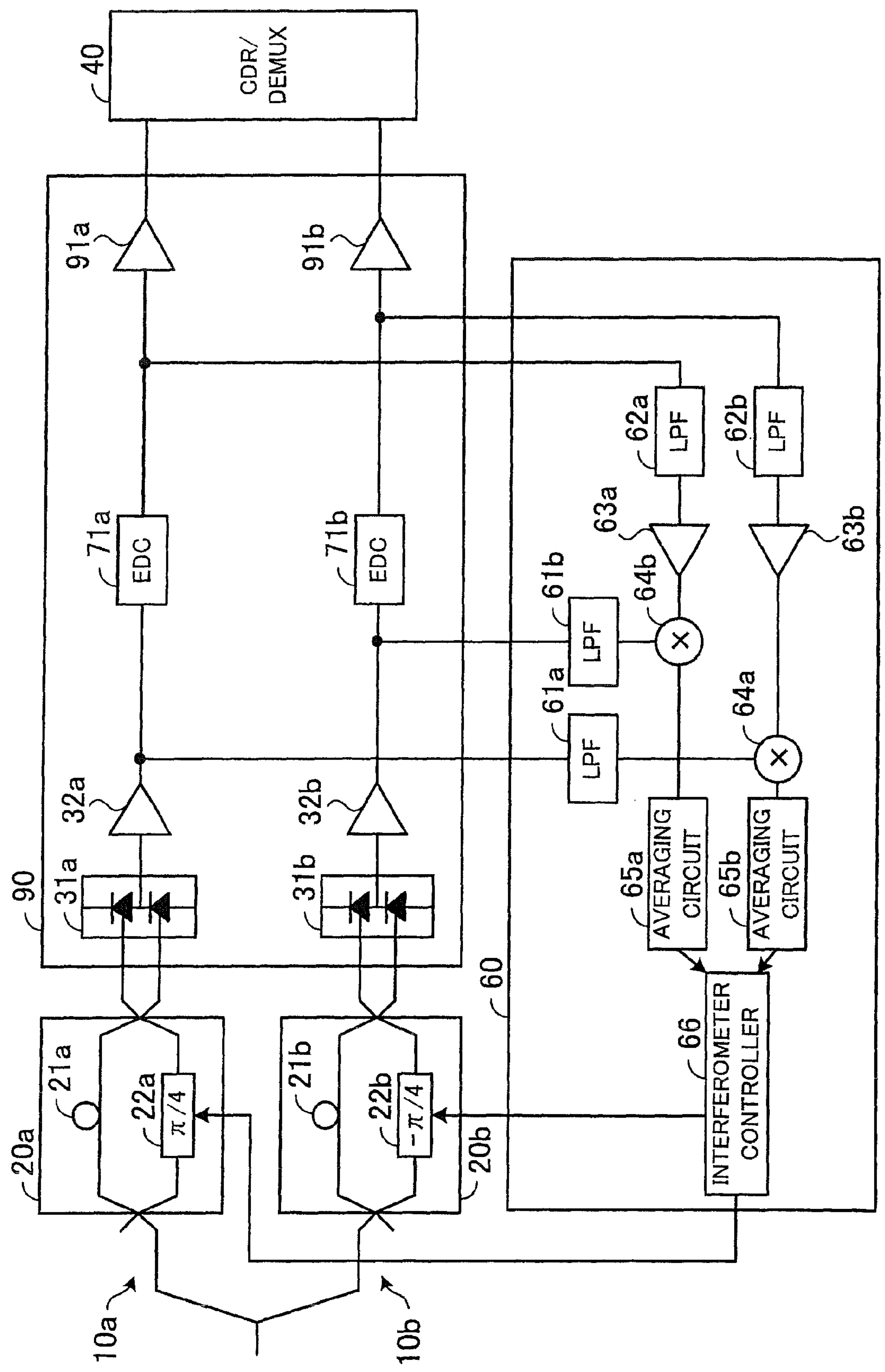
FIG. 8 is a block diagram of a DQPSK optical receiver according to a fifth embodiment.

FIG. 8 is a block diagram of a DQPSK optical receiver according to the fifth embodiment. In FIG. 8, like reference numerals are used to denote like elements also appearing in FIG. 7, and description of such elements is omitted. The DQPSK optical receiver illustrated in FIG. 8 differs from the counterpart illustrated in FIG. 7 in the configuration of a front-end module 90.

An LIA 91*a* of the front-end module 90 is connected at a stage succeeding the branch points to which the LPFs 61*a* and 62*a* associated with the A arm 10*a* are respectively connected. An LIA 91*b* is connected at a stage succeeding the branch points to which the LPFs 61*b* and 62*b* associated with the B arm 10*b* are respectively connected. Namely, the amplified yet amplitude-limited signals from the LIAs 91*a* and 91*b* are output to the CDR/DEMUX 40 only and not to the LPF 61*a*, 61*b*, 62*a* or 62*b*.

As illustrated in FIG. 8, the LIAs 91*a* and 91*b* may be provided at the stage succeeding the respective branch points to which the LPFs 62*a* and 62*b* of the A and B arms 10*a* and 10*b* are respectively connected, because the waveforms of the feedback signals are subsequently shaped by the respective LIAs 63*a* and 63*b* of the controller 60.

Thus, also in the case where the LIAs 91*a* and 91*b* are connected at the stage succeeding the respective branch points to which the LPFs 62*a* and 62*b* of the A and B arms 10*a* and 10*b* are respectively connected, the feedback control can be properly performed.

A sixth embodiment of the present invention will be now described in detail. The sixth embodiment differs from the second embodiment in that the front-end module includes additional LIAs and that the LIAs of the controller are omitted.

Figure 9:
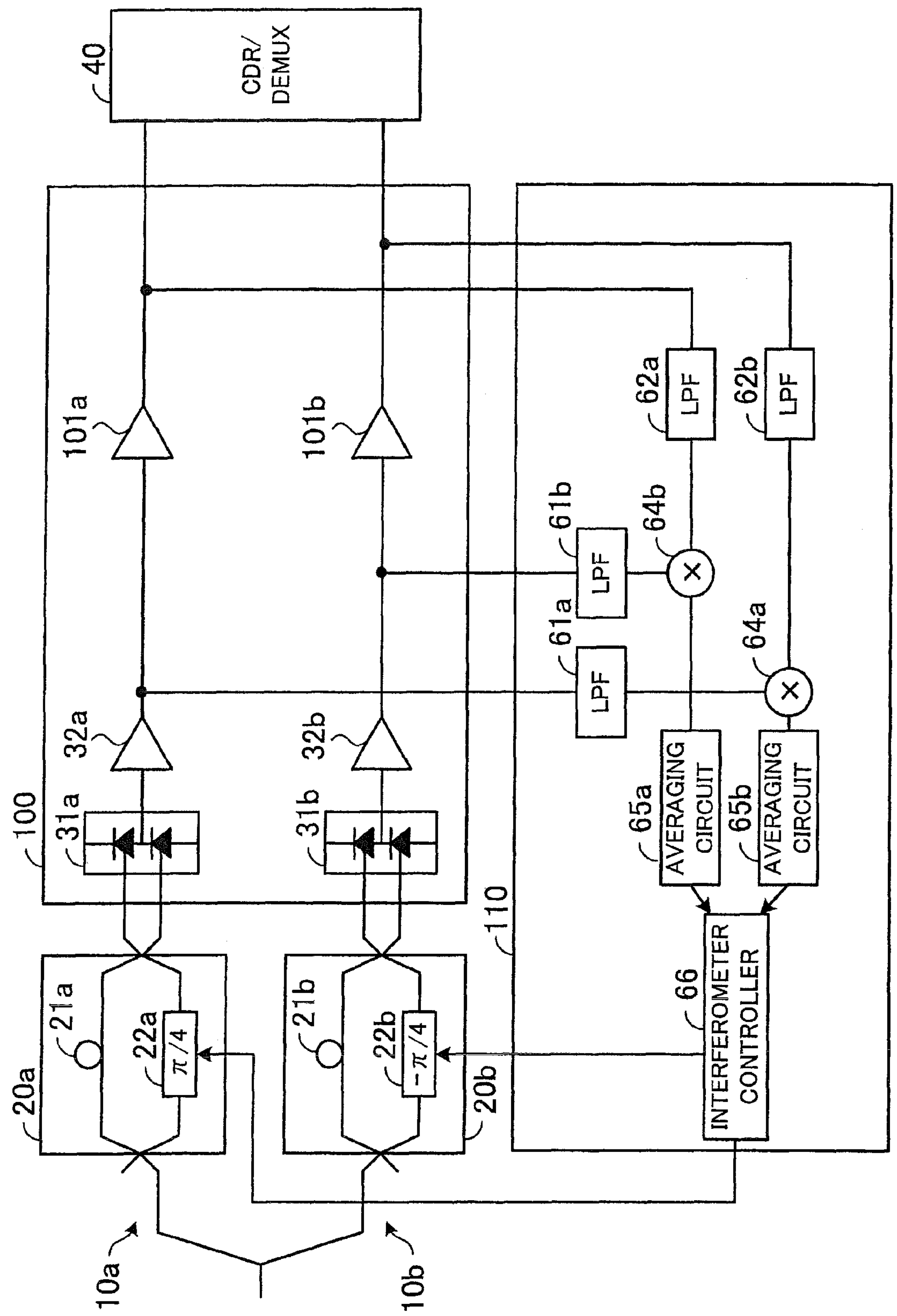
FIG. 9 is a block diagram of a DQPSK optical receiver according to a sixth embodiment.

FIG. 9 is a block diagram of a DQPSK optical receiver according to the sixth embodiment. In FIG. 9, like reference numerals are used to denote like elements also appearing in FIG. 4, and description of such elements is omitted. The DQPSK optical receiver illustrated in FIG. 9 differs from the counterpart illustrated in FIG. 4 in the configuration of a front-end module 100 and of a controller 110.

As distinct from the front-end module 30 illustrated in FIG. 4, the front-end module 100 includes an LIA 101*a* connected between the branch points to which the LPFs 61*a* and 62*a* associated with the A arm 10*a* are respectively connected. Further, an LIA 101*b* is connected between the branch points to which the LPFs 61*b* and 62*b* associated with the B arm 10*b* are respectively connected.

The controller 110 differs from the controller 60 illustrated in FIG. 4 in that the LIAs are omitted. Even though the LIAs are omitted, the LPFs 62*a* and 62*b* are input with the signals of which the waveforms have been shaped by the respective LIAs 101*a* and 101*b*. The controller 110 can therefore properly perform the feedback control, like the controller 60 in FIG. 4.

Thus, where the A and B arms 10*a* and 10*b* are provided with the additional LIAs 101*a* and 101*b*, respectively, the LIAs connected to the outputs of the LPFs 62*a* and 62*b* may be omitted, and also in this case, the feedback control can be properly performed.

A seventh embodiment of the present invention will be now described in detail. The seventh embodiment differs from the sixth embodiment in that EDCs are added to the front-end module.

Figure 10:
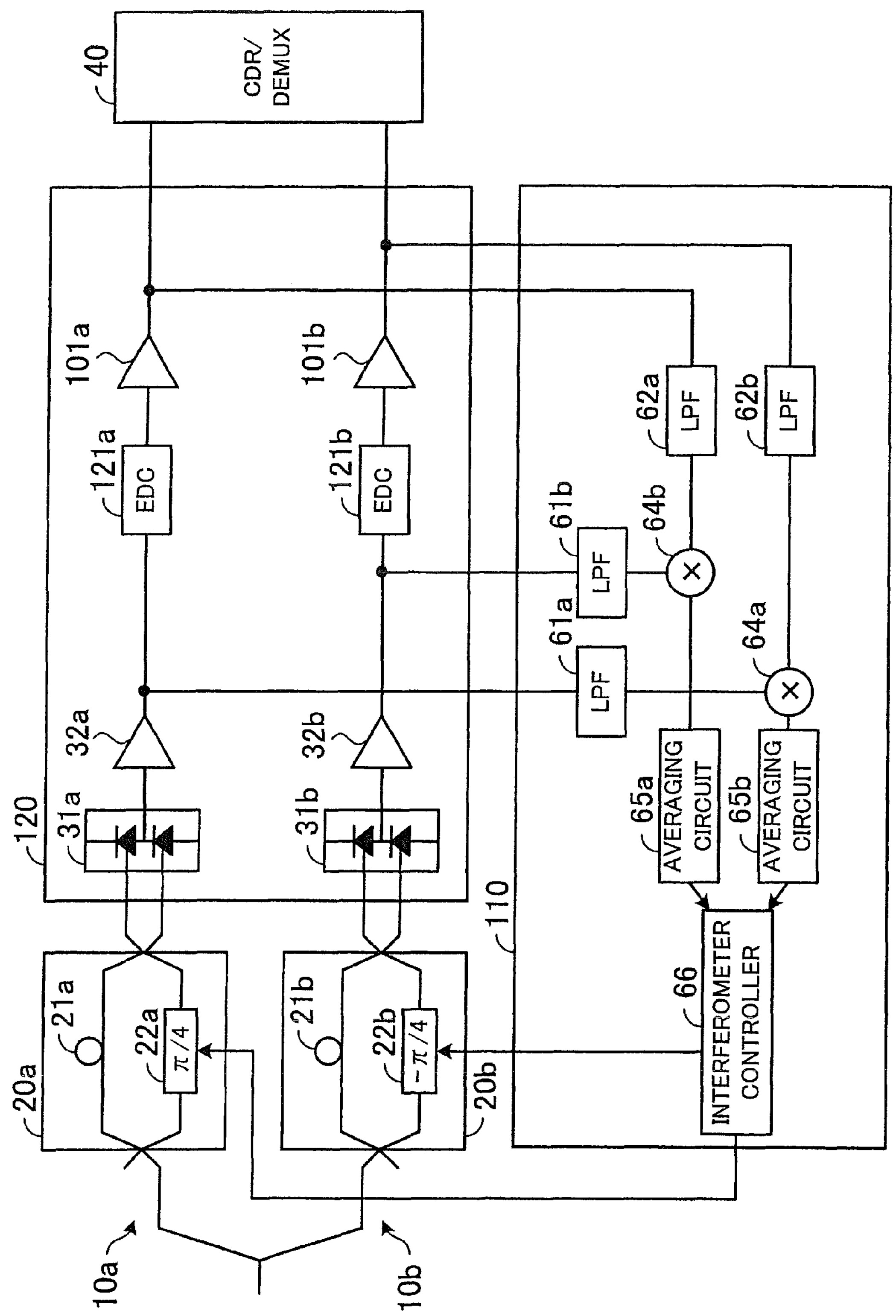
FIG. 10 is a block diagram of a DQPSK optical receiver according to a seventh embodiment.

FIG. 10 is a block diagram of a DQPSK optical receiver according to the seventh embodiment. In FIG. 10, like reference numerals are used to denote like elements also appearing in FIG. 9, and description of such elements is omitted. The DQPSK optical receiver illustrated in FIG. 10 differs from the counterpart illustrated in FIG. 9 in the configuration of a front-end module 120.

In contrast to the front-end module 100 illustrated in FIG. 9, the front-end module 120 includes an EDC 121*a* connected between the branch points to which the LPFs 61*a* and 62*a* associated with the A arm 10*a* are respectively connected. Further, an EDC 121*b* is connected between the branch points to which the LPFs 61*b* and 62*b* associated with the B arm 10*b* are respectively connected. The EDCs 121*a* and 121*b* are each a device for electrically compensating for optical dispersion. Deteriorated signals by chromatic dispersions in the transmission are electrically compensated for by the respective EDCs 121*a* and 121*b*, and the resulting signals are output to the CDR/DEMUX 40.

Also in the case where the EDCs 121*a* and 121*b* are provided for electrically compensating for optical dispersion, it is possible to properly perform the feedback control.

In the DQPSK optical receivers of the first through seventh embodiments, a TIA that outputs a differential output signal may be used as each of the TIAs 32*a* and 32*b*. Also, a LIA that outputs a differential output signal may be used as each of the LIAs 81*a*, 81*b*, 101*a* and 101*b*. By using differential output TIAs and differential output LIAs, it is possible to apply one of the outputs of the TIAs 32*a* and 32*b* to the main signal line (line leading to the CDR/DEMUX 40) and to apply the other output to the feedback signal line (line leading to the LPFs 51*a* and 51*b* or the LPFs 62*a* and 62*b*). Further, it is possible to apply one of the outputs of the LIAs 81*a* and 81*b* or the LIAs 101*a* and 101*b* to the main signal line and to apply the other output to the feedback signal line. This permits the feedback signal line to be wired without taking into account the impedance matching.

With the optical receivers disclosed herein, the feedback control can be properly carried out.

The foregoing is considered as illustrative only of the principles of the present invention. Further, since numerous modifications and changes will readily occur to those skilled in the art, it is not desired to limit the invention to the exact construction and applications illustrated and described, and accordingly, all suitable modifications and equivalents may be regarded as falling within the scope of the invention in the appended claims and their equivalents.

What is claimed is:

1. A Differential Quadrature Phase Shift Keying (DQPSK) optical receiver to receive and demodulate a DQPSK-modulated optical signal, comprising:

a first interferometer associated with a first arm;

a second interferometer associated with a second arm;

first optical-electrical converter to convert an optical signal output from the first interferometer to an electrical signal;

second optical-electrical converter to convert an optical signal output from the second interferometer to an electrical signal;

first and second low pass filters coupled to respective lines branching off from between the first optical-electrical converter and a first clock and data recovery circuit;

third and fourth low pass filters coupled to respective lines branching off from between the second optical-electrical converter and a second clock and data recovery circuit;

a first limiting amplifier to amplify a signal output from the first low pass filter and also to limit an amplitude of an output signal thereof;

a second limiting amplifier to amplify a signal output from the third low pass filter and also to limit an amplitude of an output signal thereof;

a first mixer to multiply the output signal from the first limiting amplifier by a signal output from the fourth low pass filter; and a second mixer to multiply the output signal from the second limiting amplifier by a signal output from the second low pass filter.

2. The DQPSK optical receiver according to claim 1, further comprising:

a first electrical dispersion compensator coupled between branch points to which the first and second low pass filters associated with the first arm are respectively coupled; and a second electrical dispersion compensator coupled between branch points to which the third and fourth low pass filters associated with the second arm are respectively coupled.

3. The DQPSK optical receiver according to claim 2, further comprising:

a third limiting amplifier coupled between the branch points to which the first and second low pass filters of the first arm are respectively coupled; and a fourth limiting amplifier coupled between the branch points to which the third and fourth low pass filters of the second arm are respectively coupled.

4. The DQPSK optical receiver according to claim 3, wherein each of the third and fourth limiting amplifiers outputs a differential output signal.

5. The DQPSK optical receiver according to claim 2, further comprising:

a fifth limiting amplifier provided at a stage succeeding the branch points to which the first and second low pass filters of the first arm are respectively coupled; and a sixth limiting amplifier provided at a stage succeeding the branch points to which the third and fourth low pass filters of the second arm are respectively coupled.

6. The DQPSK optical receiver according to claim 1, further comprising first and second current-voltage conversion amplifiers coupled to outputs of the first and second optical-electrical converter, respectively, to convert electric current to voltage.

7. The DQPSK optical receiver according to claim 6, wherein each of the first and second current-voltage conversion amplifiers outputs a differential output signal.

8. A Differential Quadrature Phase Shift Keying (DQPSK) optical receiver to receive and demodulate a DQPSK-modulated optical signal, comprising:

a first interferometer associated with a first arm;

a second interferometer associated with a second arm;

first optical-electrical converter to convert an optical signal output from the first interferometer to an electrical signal;

second optical-electrical converter to convert an optical signal output from the second interferometer to an electrical signal;

first and second low pass filters coupled to respective lines branching off from between the first optical-electrical converter and a first clock and data recovery circuit;

third and fourth low pass filters coupled to respective lines branching off from between the second optical-electrical converter and a second clock and data recovery circuit;

a first limiting amplifier coupled between branch points to which the first and second low pass filters associated with the first arm are respectively coupled;

a second limiting amplifier coupled between branch points to which the third and fourth low pass filters associated with the second arm are respectively coupled;

a first mixer to multiply an output of the first low pass filter by an output of the fourth low pass filter; and a second mixer to multiply an output of the third low pass filter by an output of the second low pass filter.

9. The DQPSK optical receiver according to claim 8, further comprising:

a first electrical dispersion compensator coupled between the branch points to which the first and second low pass filters of the first arm are respectively coupled; and a second electrical dispersion compensator coupled between the branch points to which the third and fourth low pass filters of the second arm are respectively coupled.

10. The DQPSK optical receiver according to claim 8, wherein each of the first and second limiting amplifiers outputs a differential output signal.

11. The DQPSK optical receiver according to claim 8, further comprising first and second current-voltage conversion amplifiers connected to outputs of the first and second optical-electrical converter, respectively, to convert electric current to voltage.

12. The DQPSK optical receiver according to claim 11, wherein each of the first and second current-voltage conversion amplifiers outputs a differential output signal.

* * * * *